(12) United States Patent  
Kim et al.

(10) Patent No.: US 9,166,751 B2
(45) Date of Patent: Oct. 20, 2015

(54) METHOD AND APPARATUS FOR TRANSMITTING AND RECEIVING CONTROL INFORMATION IN A WIRELESS COMMUNICATION SYSTEM

(75) Inventors: Younsun Kim, Gyeonggi-do (KR); Juho Lee, Gyeonggi-do (KR); Joonyoung Cho, Gyeonggi-do (KR); Jinkyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 699 days.

(21) Appl. No.: 13/416,700

(22) Filed: Mar. 9, 2012

(65) Prior Publication Data

US 2012/0230271 A1    Sep. 13, 2012

(30) Foreign Application Priority Data

Mar. 9, 2011    (KR) .................. 10-2011-0020698

(51) Int. Cl.
  H04W 4/00    (2009.01)
  H04L 5/00    (2006.01)
(52) U.S. Cl.
  CPC ............ H04L 5/0007 (2013.01); H04L 5/0057 (2013.01); H04L 5/0062 (2013.01)
(58) Field of Classification Search
  None
  See application file for complete search history.

(56) References Cited

U.S. PATENT DOCUMENTS 8,750,887 B2 *   6/2014 Chandrasekhar et al. .... 455/450
2012/0076106 A1 *   3/2012 Bhattad et al. ................ 370/330
2012/0315859 A1 *  12/2012 Lee et al. .................... 455/67.13
2013/0003788 A1 *   1/2013 Marinier et al. .............. 375/219
2013/0010707 A1 *   1/2013 Gaal et al. .................... 370/329
2013/0208677 A1 *   8/2013 Lee et al. ..................... 370/329

FOREIGN PATENT DOCUMENTS

WO    WO 2011/013990    2/2011

OTHER PUBLICATIONS

NTT Docomo, "Performance of eICIC with Control Channel Coverage Limitation", R1-103264, 3GPP TSG RAN WG1 Meeting #61, May 10-14, 2010.
Ericsson, ST-Ericcson, "Definition of ABS, Almost Blank Subframe", Tdoc R2-110938, 3GPP TSG-RAN WG2 #73, Feb. 21-25, 2011.
3rd Generation Partnership Project; Technical Specification Group Radio Access Network; Evolved Universal Terrestrial Radio Access (E-UTRA).

(Continued)

Primary Examiner — Phirin Sam
(74) Attorney, Agent, or Firm — The Farrell Law Firm, P.C.

(57) ABSTRACT

A method and apparatus are provided for transmitting control information to first and second terminals by a Base Station (BS) in a wireless communication system transmitting control information according to a plurality of muting patterns. The method includes determining a resource for transmitting a Channel Status Information Reference Signal (CSI-RS) and a resource for applying muting; determining a resource for transmitting a control signal to a first terminal according to the plurality of muting patterns; and transmitting control information including the determined resource information to at least one of the first terminal and a second terminal. The resource for transmitting the control signal to the first terminal is applied as a resource to which muting is applied for the second terminal.

16 Claims, 13 Drawing Sheets

(56) References Cited

OTHER PUBLICATIONS

Radio Resource Control (RRC); Protocol Specification (Release 10), 3GPP TS 36.331 V10.0.0, Dec. 2010.
LG Electronics, "Muting Aspects and Intercell CSI-RS Design", R1-103733, TSG-RAN WG1 Meeting #61bis, Jun. 28-Jul. 2, 2010.
Nokia, Nokia Siemens Networks, "Multi-cell CSI-RS Transmission and Related Impact to LTE Rel'8", R1-094649, 3GPP TSG RAN WG1 Meeting #59, Nov. 9-13, 2009.
Samsung, "Discussion on CSI-RS Design", 3GPP TSG RAN WG1 #61bis, R1-103655, Jun. 28, 2010-Jul. 2, 2010.
Samsung, "Views on CSI-RS Design", 3GPP TSG RAN WG1 #60bis, R1-102194, Apr. 12-16th, 2010.
Samsung, Inter-cell CSI RS Design in Heterogeneous Network, 3GPP TSG RAN WG1 #60, R101157, Feb. 22-26th, 2010.
Huawei, HiSilicon, "Further Considerations on Muting for R-PDCCH", 3GPP TSG RAN WG1 meeting #63bis, R1-110018, Jan. 17-21, 2011.

* cited by examiner

METHOD AND APPARATUS FOR TRANSMITTING AND RECEIVING CONTROL INFORMATION IN A WIRELESS COMMUNICATION SYSTEM

PRIORITY

This application claims priority under 35 U.S.C. §119(a) to Korean Patent Application No. 10-2011-0020698, which was filed in the Korean Intellectual Property Office on Mar. 9, 2011, the entire content of which is incorporated herein by reference.

BACKGROUND OF THE INVENTION

1. Field of the Invention

The present invention relates generally to a method and apparatus for transmitting and receiving control information in a wireless communication system, and more particularly, to a method and apparatus for transmitting a control signal using a muting pattern location as defined in a Long Term Evolution-Advanced (LTE-A) mobile communication system.

2. Description of the Related Art

Conventionally, a reference signal is transmitted to measure a downlink channel state in a cellular system. Specifically, in an LTE-A system, a terminal measures a channel state between a Base Station (BS) and the terminal using Channel Status Information Reference Signal (CSI-RS) provided from the BS. A received reference signal having a greater signal-to-noise power ratio of provides a more accurate measurement in channel state information. Therefore, to improve channel state information accuracy, interference power with respect to a received reference signal should be reduced.

Empty muting without a transmission time, a frequency, an antenna, and a code resource of a reference time of another transmitter is an approach for reducing interference with respect to channel state information reference information. To obtain an advantage from muting, a receiver should know which reference of a source element is muted by a transmitter. Accordingly, a muting pattern having a constant protocol has been defined in LTE-A.

However, when the conventional LTE-A muting pattern is used, control information about terminals supporting different wireless communication system protocols may not be efficiently operated.

SUMMARY OF THE INVENTION

The present invention has been made in view of the above-described problems occurring in the prior art, and provides at least the advantages described below.

Accordingly, an aspect of the present invention is to provide a method and apparatus for transmitting a new control signal using a defined muting pattern based on an LTE-A system.

In accordance with an aspect of the present invention, a method is provided for a BS to transmit control information to terminals in a wireless communication system transmitting control information according to a plurality of muting patterns. The method includes determining a resource for transmitting a Channel Status Information Reference Signal (CSI-RS) and a resource for applying muting; determining a resource for transmitting a control signal to a first terminal according to the plurality of muting patterns; and transmitting control information including the determined resource information to at least one of the first terminal and a second terminal. The resource for transmitting the control signal to the first terminal is applied as a resource to which muting is applied for the second terminal.

In accordance with another aspect of the present invention, a method is provided for a terminal to receive control information from a BS in a wireless communication system transmitting control information according to a plurality of muting patterns. The method includes receiving control information including information identifying a resource for transmitting a control signal to a first terminal among a resource transmitting a channel status information reference signal, identifying a resource to which muting is applied, and identifying a resource according to a muting pattern from the BS; and processing the control information. The resource for transmitting the control signal to the first terminal is applied to a second terminal as a resource to which muting is applied.

In accordance with another aspect of the present invention, a BS is provided for transmitting control information to first and second terminals BS in a wireless communication system transmitting control information according to a plurality of muting patterns. The BS includes a controller that determines a resource for transmitting a Channel Status Information Reference Signal (CSI-RS) and a resource for applying muting, and determines a resource for transmitting a control signal to the first terminal according to the plurality of muting patterns; and a transceiver that transmits control information including the determined resource information to at least one of the first terminal and the second terminal. The resource for transmitting the control signal to the first terminal is applied as a resource to which muting is applied for the second terminal.

In accordance with another aspect of the present invention, a terminal is provided for receiving control information from a BS in a wireless communication system transmitting control information according to a plurality of muting patterns. The terminal includes a transceiver that receives control information including information identifying a resource for transmitting a control signal to a first terminal among a resource transmitting a channel status information reference signal, identifying a resource to which muting is applied, and identifying a resource according to a muting pattern from the BS; and a controller processing the control information. The resource for transmitting the control signal to the first terminal is applied to a second terminal as a resource to which muting is applied.

BRIEF DESCRIPTION OF THE DRAWINGS

The above and other aspects, features, and advantages of the present invention will be more apparent from the following detailed description in conjunction with the accompanying drawings, in which.

DETAILED DESCRIPTION OF EMBODIMENTS OF THE INVENTION

Various embodiments of the present invention are described in detail below with reference to the accompanying drawings. Detailed descriptions of well-known functions and structures incorporated herein may be omitted to avoid obscuring the subject matter of the present invention.

A detailed descriptions of embodiments of the present invention are provided below based on an Orthogonal Frequency Division Multiplexing (OFDM) system, particularly, a 3rd Generation Partnership Project (3GPP) Evolved Universal Terrestrial Radio Access (EUTRA) system, the present invention is also applicable to other communication systems having similar technical backgrounds and channel forms by applying variations and modifications falling within the spirit and scope of the present invention, as apparent to those skilled in the art.

Figure 1:
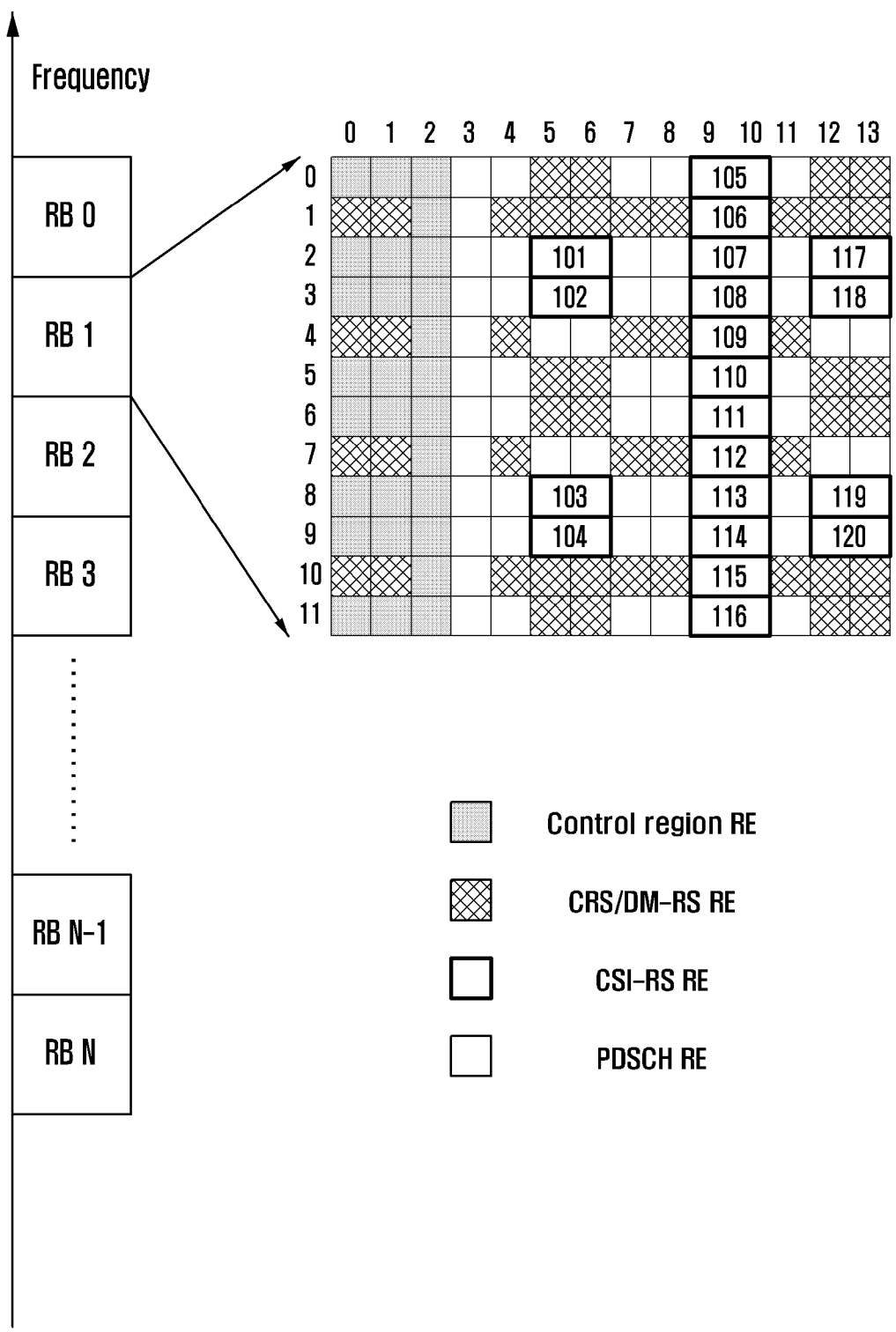
FIG. 1 illustrates a location of a CSI-RS transmitted by a BS to a terminal.

FIG. 1 illustrates a location of a CSI-RS transmitted by a BS to a terminal.

Referring to FIG. 1, a signal with respect to two CSI-RS antenna ports for each location is designed to be transmitted in a location from reference numeral 101 to reference numeral 120. That is, a BS transmits a signal though two CSI-RS antenna ports for measuring a downlink to the terminal. For a cellular system including a plurality of cells, locations for each cell are allotted as different locations in the Resource Block (RB) 1 in FIG. 1, where a CSI-RS may be transmitted. For example, for a cell 1, a CSI-RS is transmitted in location 101, and for a cell 2, a CSI-RS is transmitted in location 105. Additionally, time and frequency resources for CSI-RS transmission may be allotted in different locations for each cell to prevent mutual interference between CSI-RSs of different cells.

In FIG. 1, a system bandwidth includes N RBs, and a CSI-RS is transmitted in a constant location for each RB. For example, in an LTE-A system including 25 RBs, i.e., when N=24, signals through two CSI-RS antenna ports are transmitted in location 101 in each of the 25 RBs.

In order to increase a capacity gain, information regarding a state of a wireless channel is used. Further, as described above, as the accuracy of channel state information improves, a capacity gain is further improved. That is, as a signal-to-noise power ratio of a received reference signal increases, the accuracy of a channel state information measurement using the reference value also increases. Accordingly, to improve the accuracy of channel state information, interference power with respect to the received reference signal should be reduced. As described above, empty muting without a transmission time, a frequency, an antenna, and a code resource of a reference time of another transmitter is an approach for reducing interference with respect to channel state information reference information.

However, to obtain an advantage of the muting, a receiver should know which reference signal of a resource element location is being muted by the transmitter.

Figure 2:
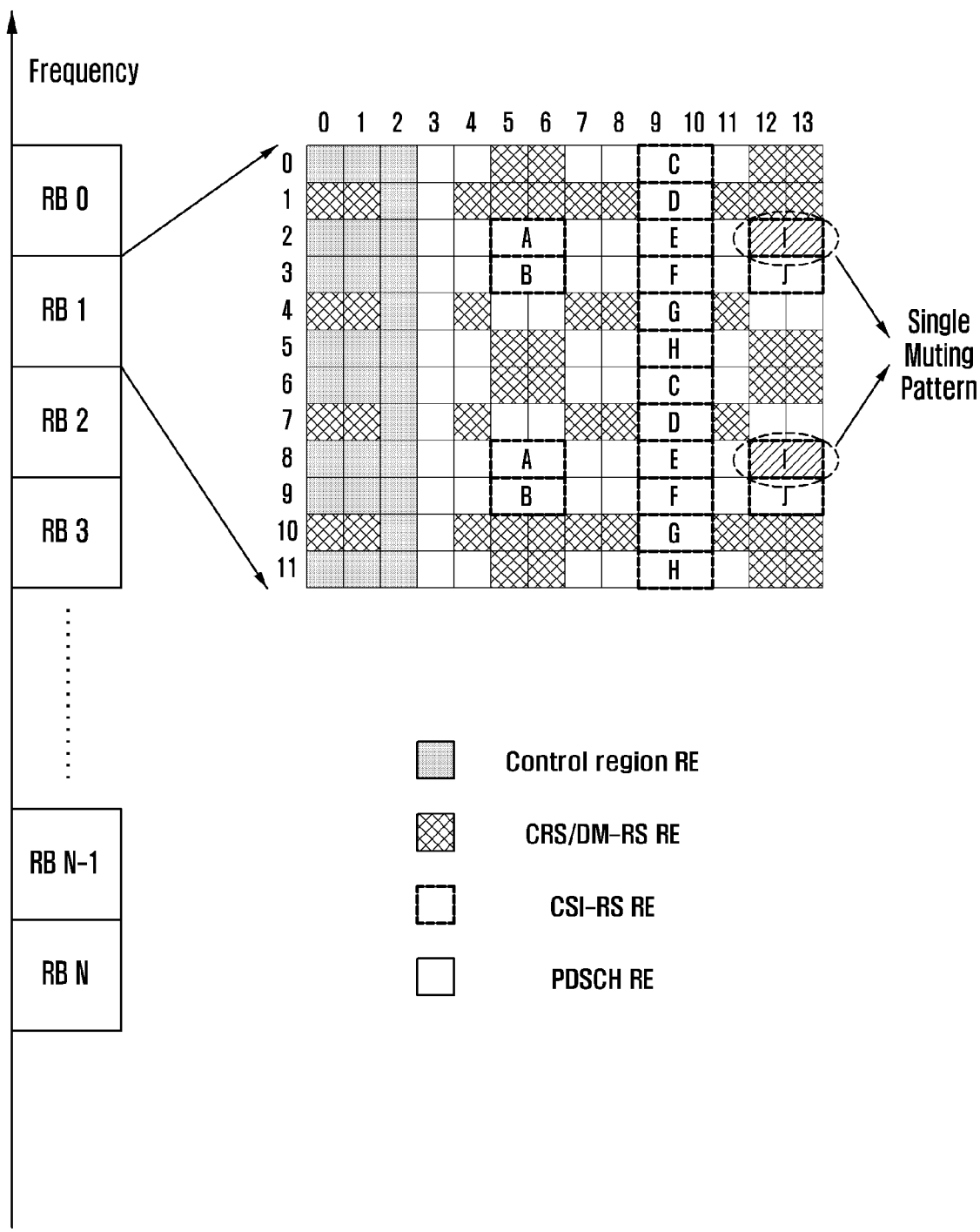
FIG. 2 illustrates a conventional muting pattern as defined in an LTE-A.

FIG. 2 illustrates a conventional muting pattern defined in an LTE-A system.

Referring to FIG. 2, 10 muting patterns A to J are designed to accord with 4 port CSI-RS transmission patterns, respectively. By making the muting pattern according with a CSI-RS transmission pattern, a BS may reduce an interference effect by using muting when transmitting a CSI-RS to another BS. Muting included in the LTE-A system is designed to be applicable to muting with respect to a plurality of muting patterns, such that a BS may reduce interference with respect to CSI-RSs of a plurality of neighboring BSs.

Figure 3:
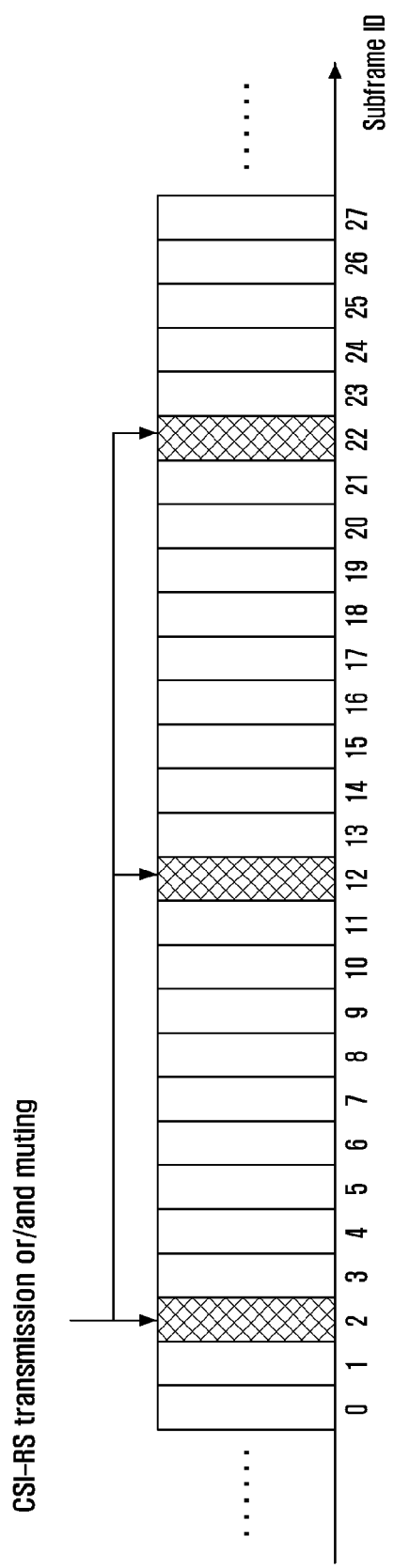
FIG. 3 illustrates conventional transmission and muting of a CSI-RS in an LTE-A system.

FIG. 3 is illustrates conventional transmission and muting of a CSI-RS in an LTE-A system.

Referring to FIG. 3, a BS performs CS-RS transmission or muting application for 10 sub-frames. The sub-frame is a unit classifying a time interval in LTE and LTE-A systems, which is 0.001 sec or 1 msec. Accordingly, the CSI-RS transmission or muting application is achieved for 10 msec in FIG. 3.

When the CSI-RS transmission or muting application is performed, an LTE-A terminal performs an operation in a corresponding sub-frame as follows:

1. CSI-RS: The terminal measures a state of a downlink channel in a resource (i.e., frequency and time) section defined with a CSI-RS from a BS. That is, a CSI-RS is measured in a defined CSI-RS transmission location as illustrated in FIG. 1.

2. Muting: A frequency time section designated with muting from the BS is determined as a resource not allotted to the BS to disregard a corresponding section and advance to a next valid resource. That is, the BS determines a frequency time section designated with muting as a resource not used in the transmission of a Physical Downlink Shared CHannel (PDSCH), skips a corresponding section, and advances to a next section.

As illustrated above, in the LTE-A system, a terminal measures a signal in a section designated with CSI-RS, but does not measure the signal in a section with muting.

Such an operation may also be used to transmit a new signal in a system after the LTE-A system, i.e., a new system.

In accordance with an embodiment of the present invention, a newly defined signal (e.g., a new control signal) may be transmitted to new terminals in a new system defined after an LTE-A system, but based on an LTE-A system using a muting pattern defined in LTE-A, and may simultaneously exclude an interference effect in an existing LTE-A legacy terminal.

For a new function, i.e., a function implemented in a system defined after LTE-A, in accordance with an embodiment of the present invention, control channels may be transmitted with a constant frequency time resource, without causing an interference effect in an LTE-A legacy terminal.

Figure 4:
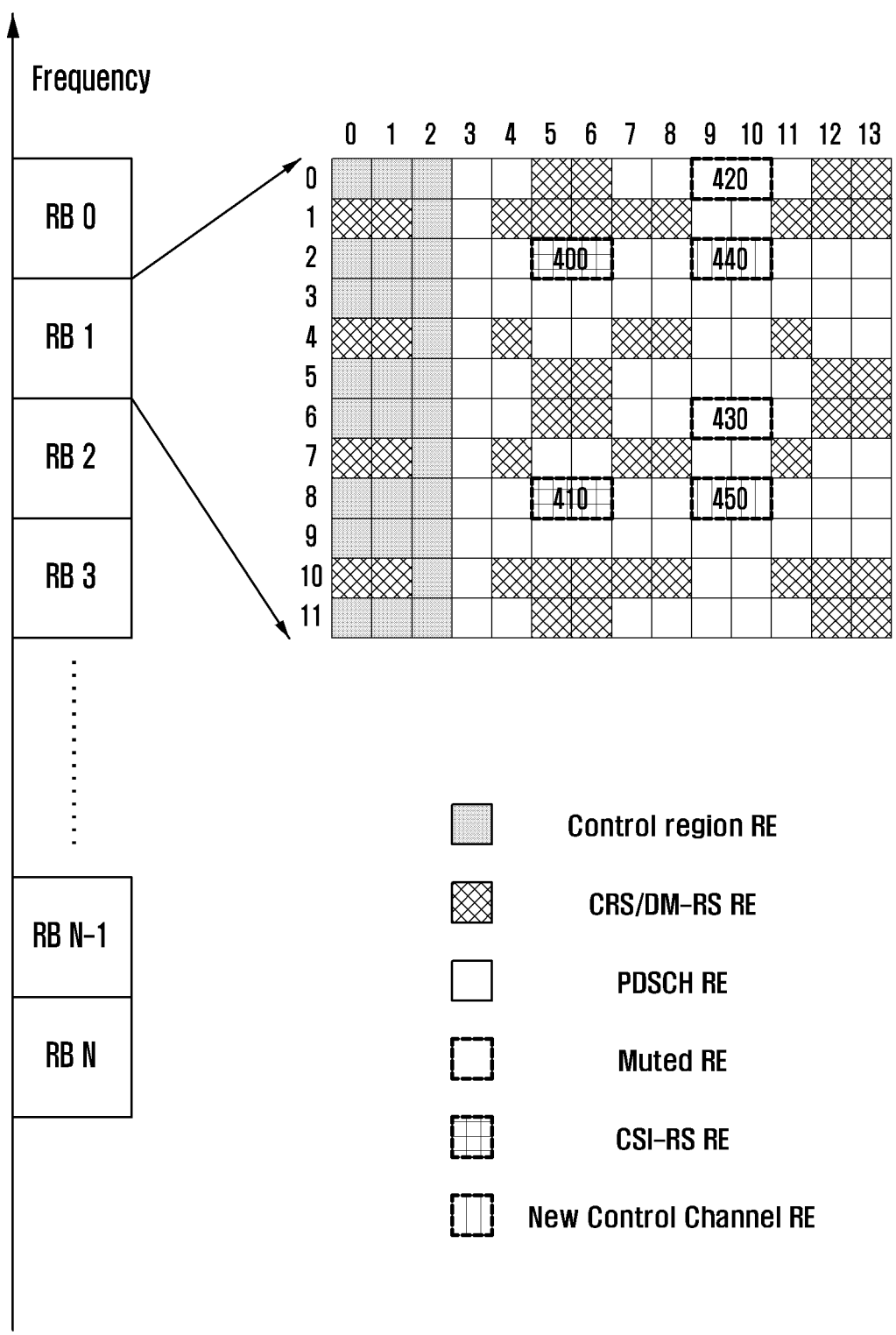
FIG. 4 illustrates a method of transmitting a control signal according to an embodiment of the present invention.

FIG. 4 illustrates a method of transmitting a control signal according to an embodiment of the present invention.

Referring to FIG. 4, a BS transmits a signal or performs muting in locations 400, 410, 420, 430, 440, and 450, which breakdown as follows:

1. Locations 400 and 410: locations at which a CS-RS that an LTE-A legacy terminal or a new terminal may receive is transmitted;

2. Locations 420 and 430: locations at which the LTE-A legacy terminal and the new terminal are all mute; and 3. Locations 440 and 450: locations at which the LTE-A legacy terminal is mute, but a control signal is transmitted to a new terminal.

Accordingly, a BS transmits a control signal for only a new terminal in locations 440 and 450. It is important that the control signal transmitted to only the new terminal does not cause interference in the LTE-A legacy terminal.

In accordance with an embodiment of the present invention, the legacy LTE-A terminal determines that a control signal for only a new terminal in locations 440 and 450 is a part of data transmission for the legacy LTE-A terminal. When a receiving operation is performed, a corresponding terminal receives an interference effect due to a control signal in locations 440 and 450 and the performance is deteriorated in receiving a data channel.

In accordance with an embodiment of the present invention, in order to exclude interference influencing on the legacy LTE-A terminal when transmitting a control signal for only a new terminal, the following information is provided to the legacy terminal using higher layer signaling.

Higher Layer Signaling for Legacy Terminal
1. Locations 400 and 410: CSI-RS is transmitted
2. Locations 420 and 430: muting is applied
3. Locations 440 and 450: muting is applied That is, information which the BS transmits to the legacy terminal through higher layer signaling includes information identifying where the legacy terminal receives CSI-RS and where muting is applied.

Likewise, the BS can also provide the following information to a new through higher layer signaling.

Higher Layer Signaling for a Terminal of New Release
1. Locations 400 and 410: CSI-RS is transmitted
2. Locations 420 and 430: muting is applied
3. Locations 440 and 450: a control signal is transmitted That is, information which the BS transmits to a new terminal includes information identifying where the new terminal receives a CSI-RS, where muting is applied, and where a control signal is transmitted using a muting pattern.

When different transmission/reception situations are notified to the legacy terminal and the new terminal using high layer signaling, the legacy terminal recognizes that muting is applied in locations 440 and 450, and does not include a corresponding resource into its data channel receiving procedure. The new terminal recognizes that a control signal is transmitted in locations 440 and 450 and controls a control signal receiver to be operated in a corresponding resource. That is, the BS transmits different information using higher layer signaling according to whether a terminal connecting to the BS is a legacy terminal or a new release terminal.

The control signal, i.e., a control signal for a new terminal according to the present invention is essentially transmitted using resources according to a plurality of muting patterns as illustrated in FIG. 2. That is, a control signal transmitted to only a new release terminal has a characteristic not to be transmitted using frequency and time resources deviated from a muting pattern.

The transmission of the control signal is limited to the muting pattern to exclude interference on a legacy LTE-A terminal. For the legacy LTE-A terminal, because a function of setting frequency and time resources is excluded, except for a muting pattern not to be used, the control signal is limited to the muting pattern.

Control information transmitted to a new terminal may be transmitted, regardless of the presence of a transmission of the CSI-RS to a sub-frame.

Figure 5:
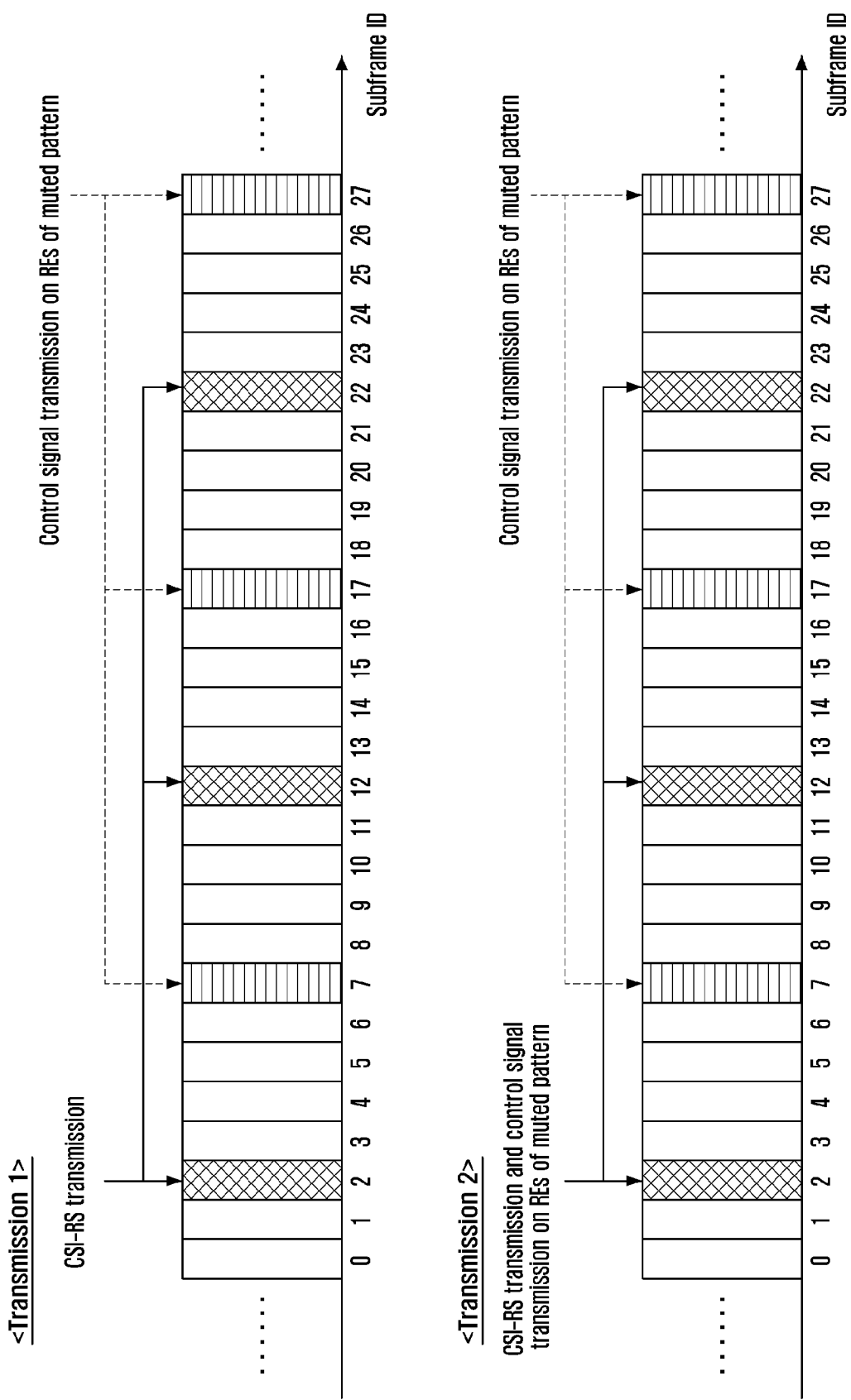
FIG. 5 illustrates control information transmitted with a CSI-RS according to an embodiment of the present invention.

FIG. 5 is a diagram illustrating control information transmitted with a CSI-RS according to an embodiment of the present invention.

Referring to FIG. 5, for transmission 1, the CSI-RS and a control signal are transmitted in a sub-frame. A location and a control signal in the sub-frame to which the CSI-RS is transmitted may be independently set.

For transmission 2, the CSI-RS and the control signal are simultaneously transmitted in a part of the sub-frames. As illustrated in transmission 2, when two signals are simultaneously transmitted in a part of the sub-frame, a location and a control signal in the sub-frame to which the CSI-RS is transmitted should be set not to overlap locations to be transmitted. For example, the CSI-RS is transmitted in location 101 of FIG. 1, and a control signal is transmitted in a location corresponding to a muting pattern C of FIG. 2.

Control information transmitted to the new terminal according to an embodiment of the present invention is in the form of a wideband signal transmitted through a wideband or of a sub-band signal transmitted through a narrow band.

Figure 6:
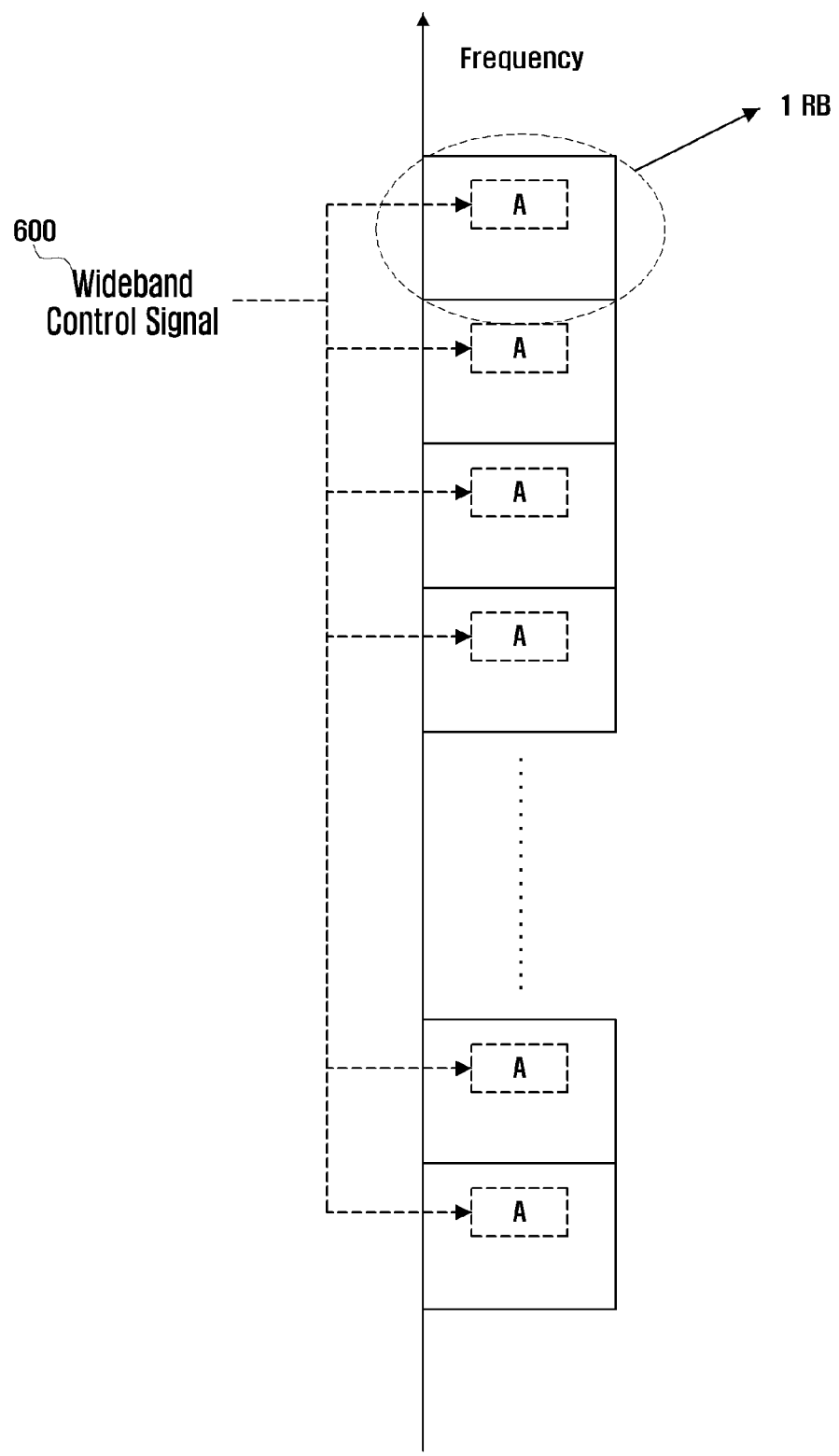
FIG. 6 illustrates a method of transmitting a wideband signal according to an embodiment of the present invention.

FIG. 6 illustrates a method of transmitting a wideband signal according to an embodiment of the present invention.

Referring to FIG. 6, a control signal transmitted for only a new terminal is transmitted using a resource according to a muting pattern A. A wideband control signal 600 is transmitted in a location of a muting pattern A in all RBs of a system bandwidth. As described above, transmitting control information using a constant muting pattern for each RB of the system bandwidth is suitable for transmission of a broadcasting scheme simultaneously transmitting the same control information to a plurality of terminals.

Figure 7:
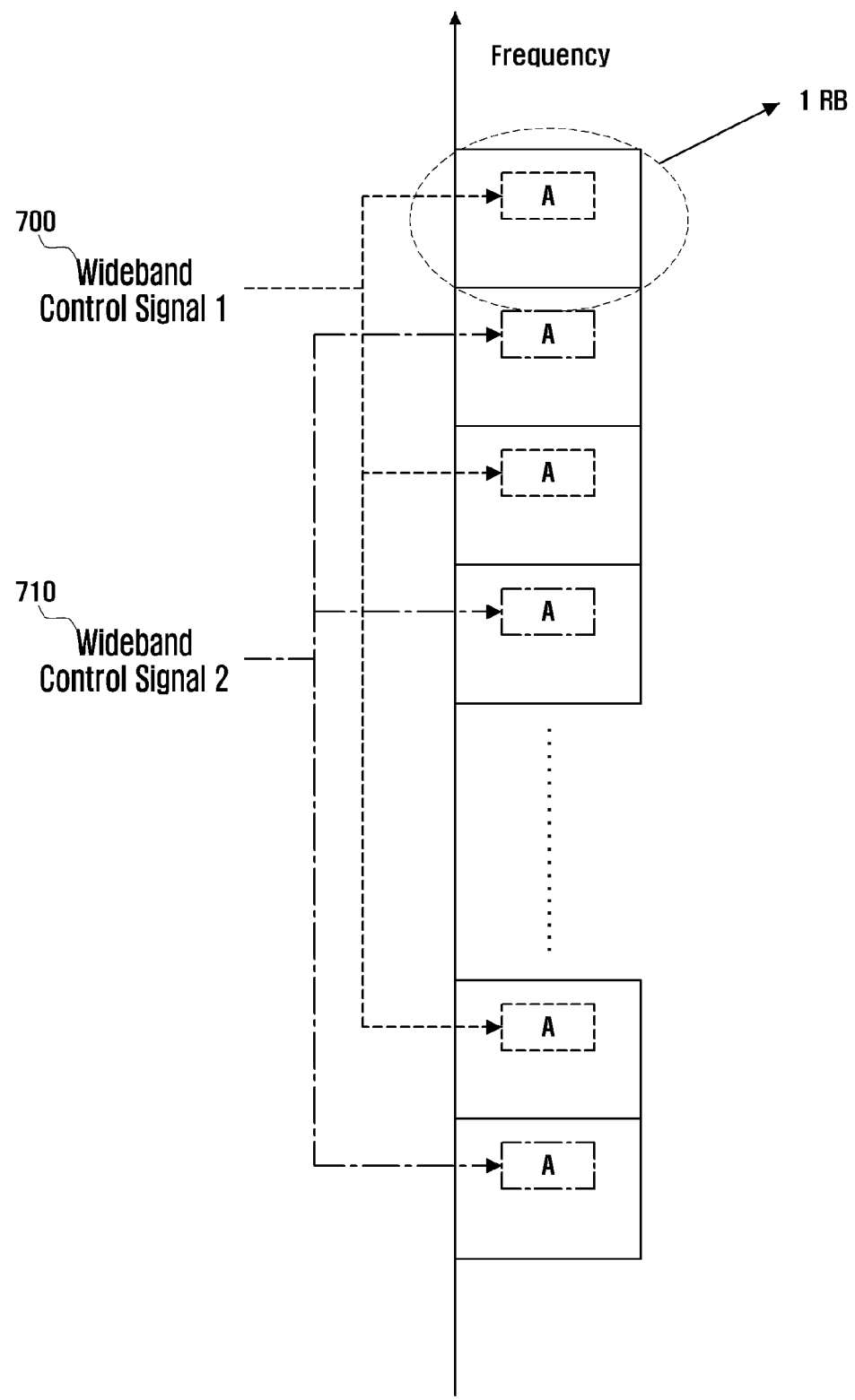
FIG. 7 illustrates a method of transmitting a wideband control signal for a terminal of new release according to an embodiment of the present invention.

FIG. 7 illustrates a method of transmitting a wideband control signal for only a new terminal according to an embodiment of the present invention. Specifically, a control signal transmitted for a new terminal in FIG. 7 is transmitted through a resource according a muting pattern A, in the same manner as illustrated in FIG. 6. However, in FIG. 7, a plurality of wideband control signals are transmitted instead of only one type of wideband control signal.

Referring to FIG. 7, a wideband control signal 1 (700) and a wideband control signal 2 (710) are transmitted in a location of a muting pattern A. However, these control signals are not transmitted in all RBs, but are transmitted in only some of the RBs. As described above, presence of transmissions of the wideband control signal 1 and the wideband control signal 2 transmitted in a corresponding RB may be determined according to whether an RB index of the RB is an odd or even number. Although FIG. 7 illustrates that two wideband control signals are transmit in the same muting pattern, the same method are applicable to where three or more wideband control signals are transmitted. For example, to transmit N wideband control signals in a muting pattern location, a modulo N operation is performed with respect to an RB index, to determined which RB is allotted by wideband control signals. That is, an i-th wideband control signal of N wideband control signals is transmitted using an RB in which an RB index satisfies Equation (1) below.

$$\text{RBindex} \bmod N = I \tag{1}$$

Further, although FIG. 7 illustrates that a wideband control signal is transmitted using one muting pattern, the wideband control signal may be transmitted using a plurality of muting patterns.

Control information to be transmitted to a new terminal according to an embodiment of the present invention may be in the form of a wideband signal transmitted through a wideband or of a sub-band signal transmitted through a narrow band.

Figure 8:
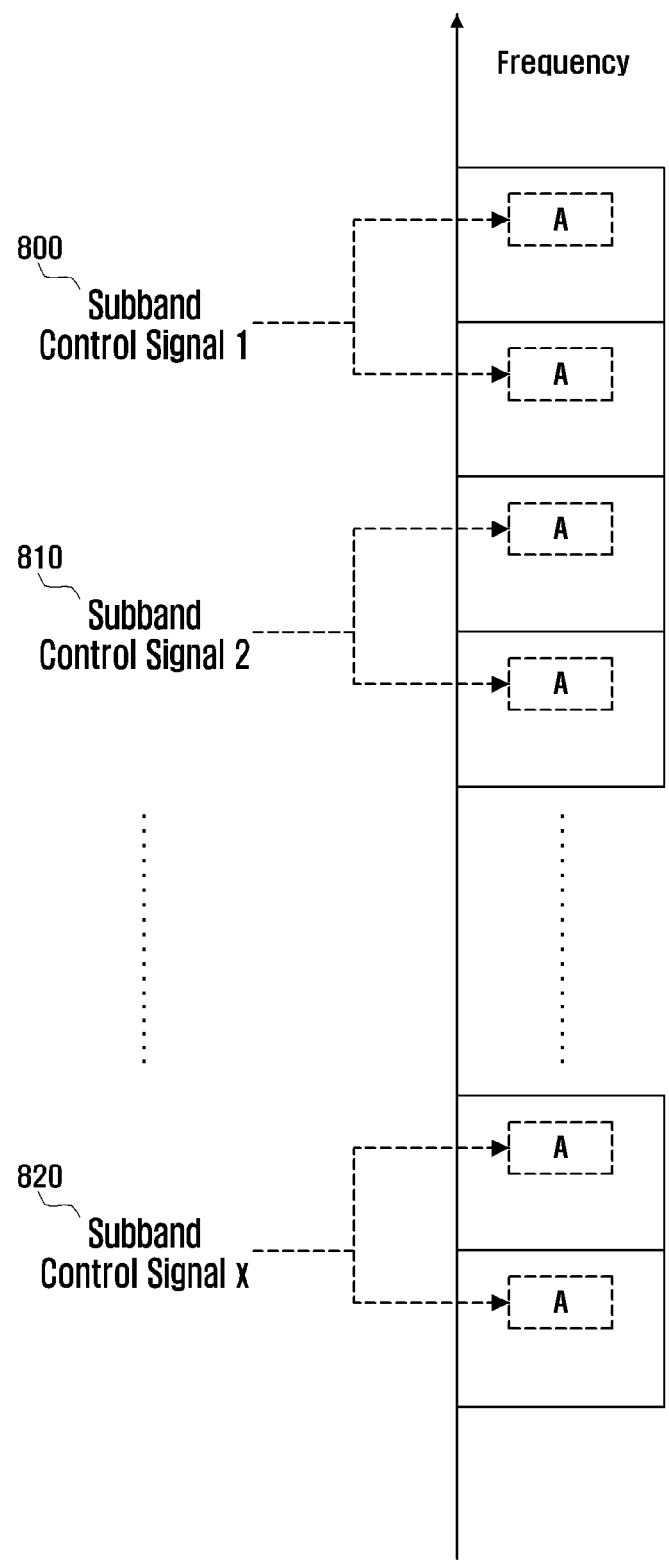
FIG. 8 illustrates a method of transmitting a sub-band control signal using a narrow band from a total system bandwidth according to an embodiment of the present invention.

FIG. 8 illustrates a method of transmitting a sub-band control signal using only a narrow band from a total system bandwidth according to an embodiment of the present invention.

Referring to FIG. 8, a control signal to be transmitted for only a new terminal is transmitted using a muting pattern A. A plurality of sub-band control signals, i.e., sub-band control signals 800, 810, and 820 are transmitted in only some of the RBs of a system bandwidth. As illustrated in FIG. 8, transmission of the sub-band control signal is available for transmitting a control signal to a certain terminal. Conversely, as illustrated in FIG. 6 and FIG. 7, transmission of the wideband control signal is available for transmitting a control signal to a plurality of unspecified terminals.

Figure 9:
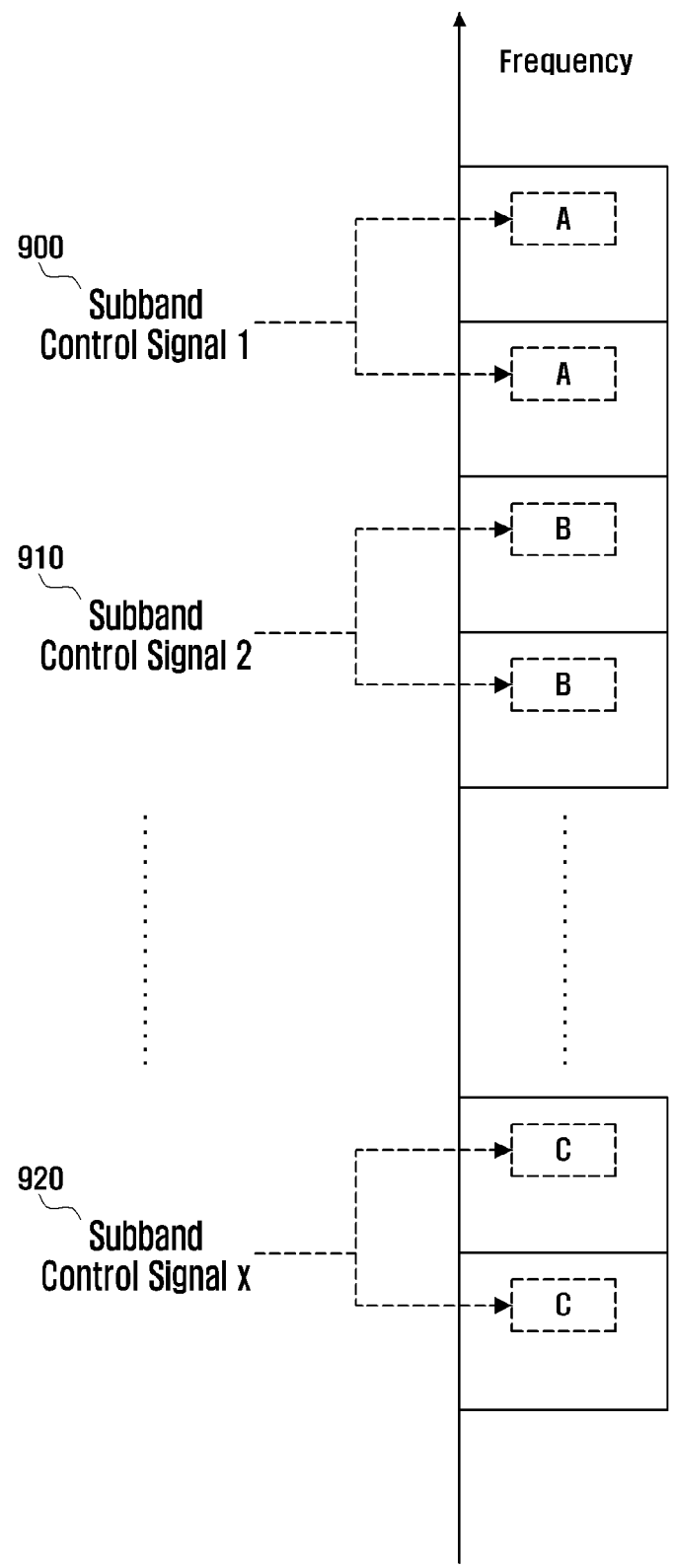
FIG. 9 illustrates a method of transmitting a sub-band control signal according to an embodiment of the present invention.

FIG. 9 illustrates a method of transmitting a sub-band control signal according to an embodiment of the present invention. Specifically, FIG. 9 illustrates where a separate muting pattern is allotted for each sub-band control signal.

Referring to FIG. 9, the BS transmits a sub-band control signal 1 (900) in a location of a muting pattern A, transmits a sub-band control signal 2 (910) in a location of a muting pattern B, and transmits a sub-band control signal x (920) in a location of a muting pattern C. A separate muting pattern is allotted for each sub-band control signal, and the sub-band control signals are transmitted using different space-time resources, enabling transmission of different types of control signals for a certain terminal.

Figure 10:
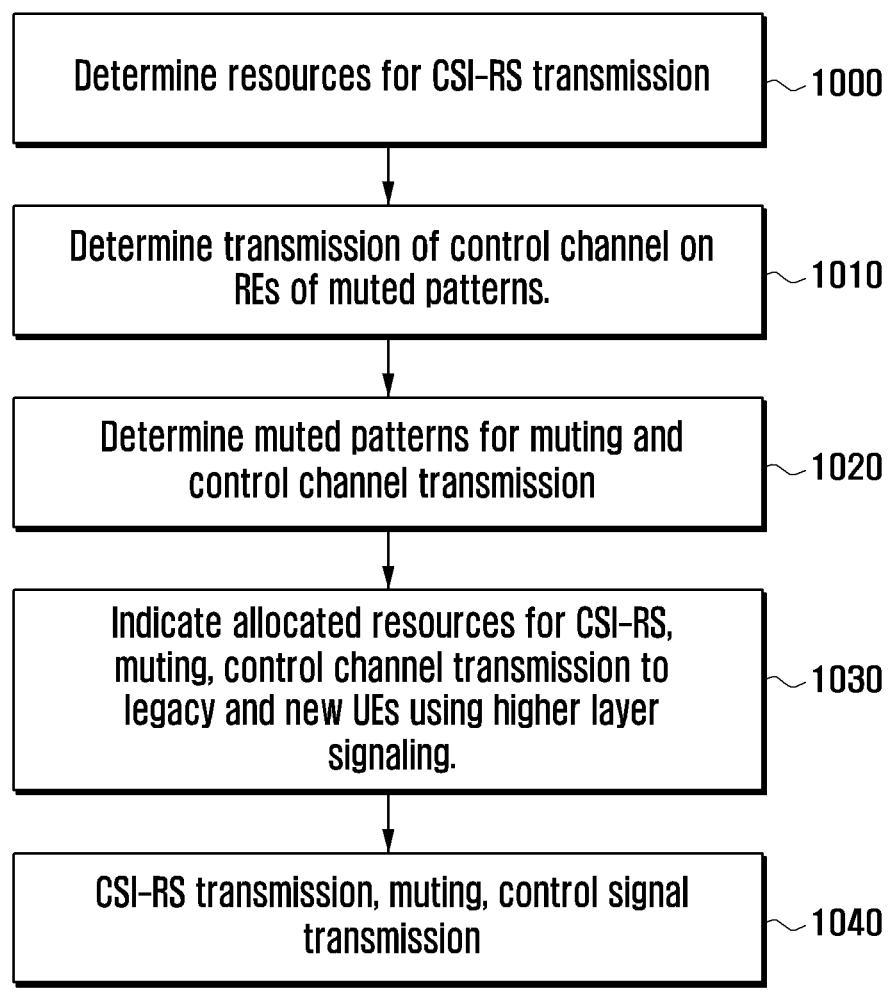
FIG. 10 is a flowchart illustrating method of transmitting a control signal by a BS according to an embodiment of the present invention.

FIG. 10 is a flowchart illustrating a method of transmitting a control signal by a BS according to an embodiment of the present invention.

Referring to FIG. 10, the BS determines resources, i.e., a frequency and a time, to be used for transmitting a CSI-RS in step 1000. For example, a transmission period, a number of antenna ports, and detailed locations as illustrated in FIG. 1 may be used as factors for determining frequency and time resources of the CSI-RS.

In step 1010, is the BS determines whether muting is applied to frequency and time resources. The BS does not allot transmission power to muted frequency and time resources. The BS performs steps 1000 and 1010, such that the muted frequency and time resources of step 1010 do not overlap with frequency and time resources to which CSI-RS is transmitted from step 1000.

In step 1020, the BS determines a muting pattern to be used for transmitting a control signal to a new terminal. For example, the muting pattern is selected from a plurality of muting patterns as illustrated in FIG. 2, and should not overlap the CSI-RS and frequency and time resources used for the muting.

In step 1030, the BS transfers information to a legacy and/or new terminal using higher layer signaling.

The information for the legacy terminal includes information for receiving the CSI-RS, and information about frequency and time resources to which muting is applied.

Further, the information for the new terminal includes information for receiving CSI-RS, information regarding frequency and time resources to which muting is applied, and information regarding frequency and time resources to which a control signal is transmitted using a muting pattern.

The information regarding the frequency and time resources to which muting is applied for the legacy terminal includes information regarding frequency and time resources to which actual muting is applied and frequency and time resources to which a control signal for a new terminal is transmitted. Accordingly, a legacy terminal receiving information as illustrated in step 1030 recognizes a transmitted control signal using a muting pattern as muting, and then does not process it as a traffic channel receiving signal.

The information regarding frequency and time resources to which muting is applied for the new terminal may be determined by one of the two following approaches.

Approach 1: perform in the same manner as in muting relation information of a legacy terminal.

Approach 2: exclude frequency and time resources to which a control signal of a muting pattern is transmitted from muting relation information for the legacy terminal.

When the Approach 1 is used, a new terminal receives first information regarding frequency and time resources to which muting is applied, and then applies second information regarding frequency and time resources to which a control signal is transmitted using a muting pattern to the first information, thereby determining which frequency time muting is applied.

When Approach 2 is used, it may be determined which frequency and time resources actual muting is applied.

In step 1040, the BS performs CRI-RS transmission, muting application, and transmission of a control signal using a muting pattern.

Figure 11:
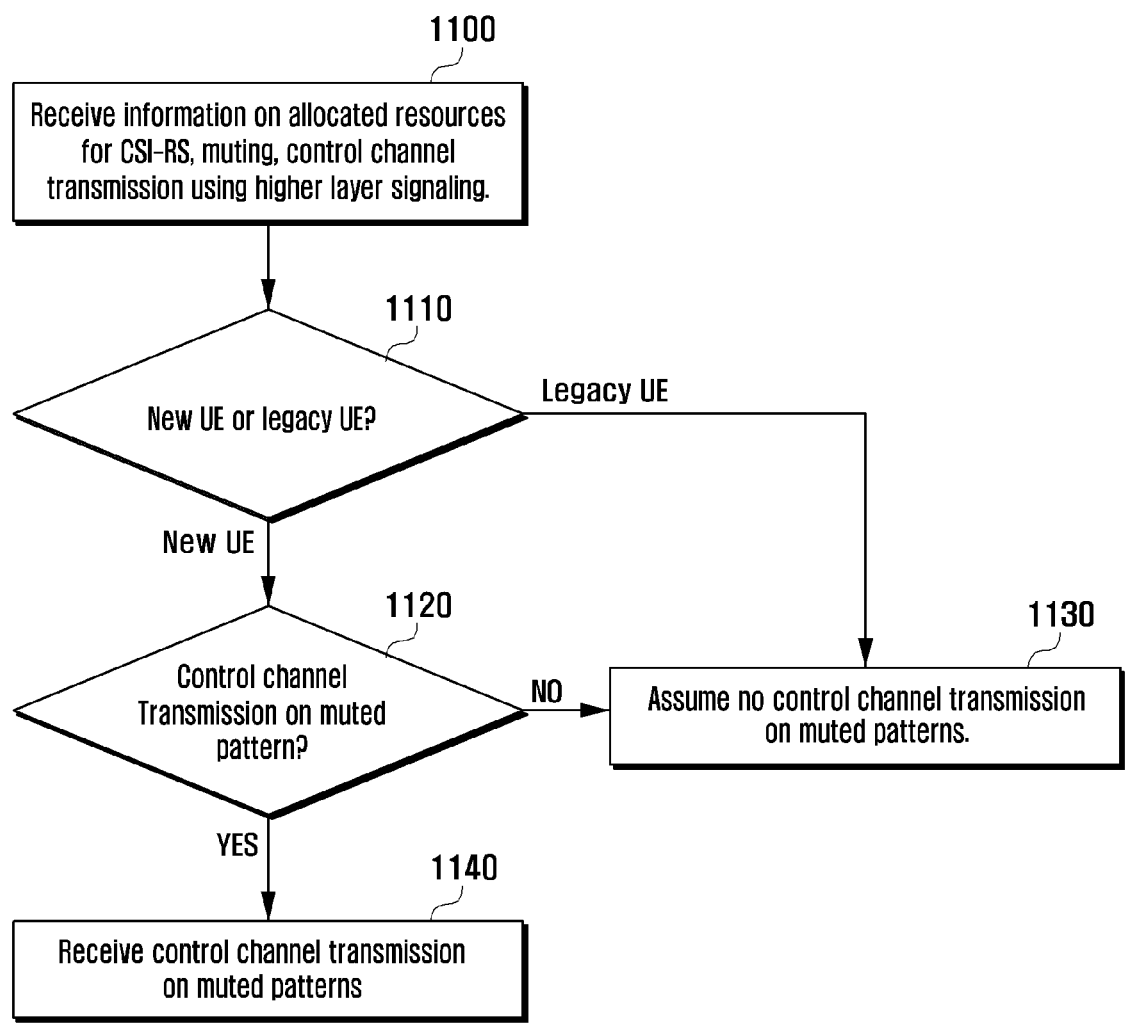
FIG. 11 is a flowchart illustrating a method of receiving control information from a BS according to an embodiment of the present invention.

FIG. 11 is a flowchart illustrating an operation sequence of a terminal receiving control information provided from a BS according to an embodiment of the present invention.

Referring to FIG. 11, in step 1100, the terminal receives a CSI-RS provided from the BS, muting, and information associated with transmission of a control signal using a muting pattern. After receiving information provided from the BS, the terminal operates differently according to whether it is a legacy terminal or a new terminal.

For the legacy terminal in step 1110, it is determined that there is no control channel transmitted using a muting pattern in step 1130.

However, for the new terminal in step 1110, the BS determines whether a control channel is transmitted on the muted control pattern in step 1120.

When the control channel is transmitted on the muted control pattern, the new terminal receives a control channel in a muting pattern in step 1140. However, when the control channel is not transmitted on the muted control pattern, the new terminal in step 1120, the new terminal assumes that the control signal is not transmitted using a muting pattern as in step 1130.

Although not illustrated in FIG. 11, the terminal may receive other control information from the BS through higher layer signaling before reception of the control signal. For example, a new terminal may receive information for receiving a CSI-RS, information about frequency and time resources to which muting is applied, and resource information transmitting a control signal with respect to the new terminal through the higher layer signaling. Further, an LTE-A legacy terminal may receive information for receiving a CSI-RS, and information about frequency and time resources to which muting is applied, through the higher layer signaling.

Figure 12:
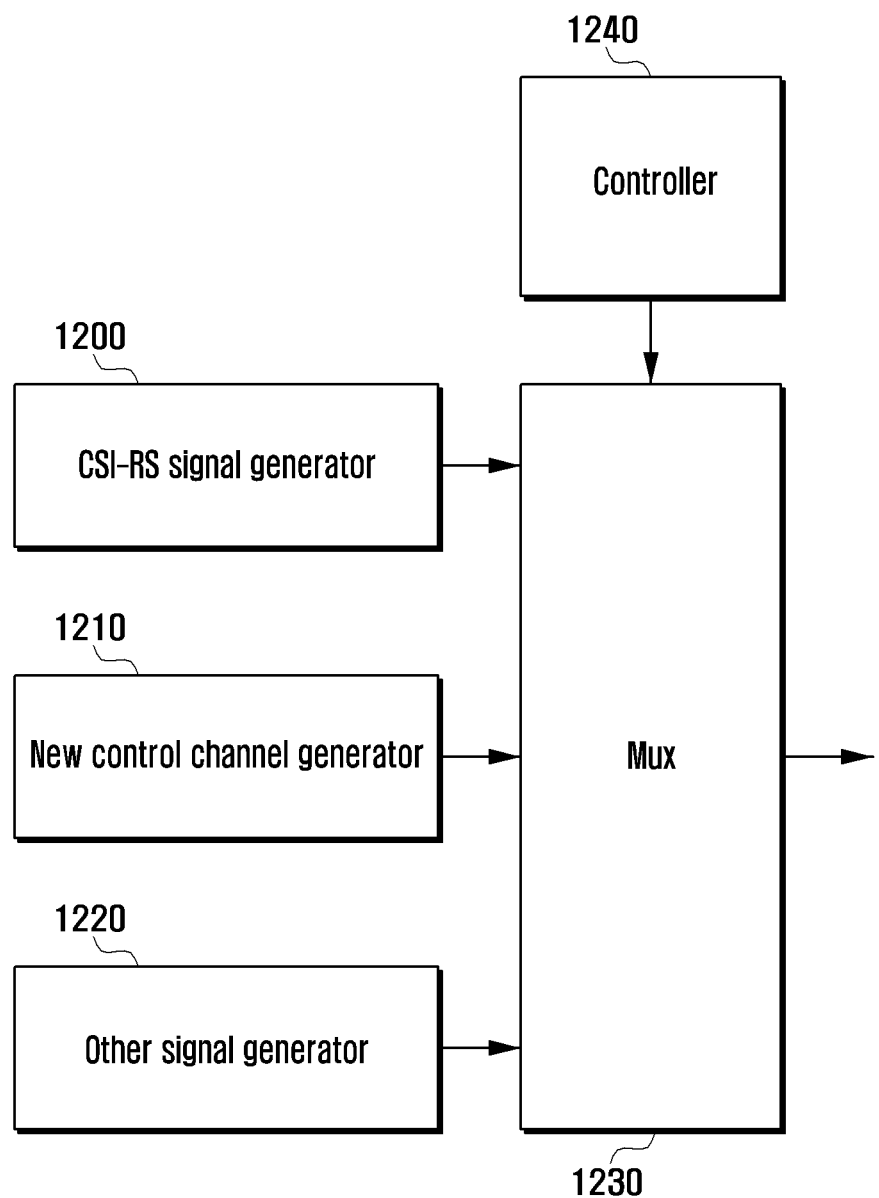
FIG. 12 is a block diagram illustrating a BS for transmitting a control signal according to an embodiment of the present invention.

FIG. 12 is a block diagram illustrating a BS for transmitting a control signal according to an embodiment of the present invention.

Referring to FIG. 12, the BS includes a CSI-RS signal generator 1200, a new control channel generator 1210, another signal generator 1220, a multiplexer (Mux) 1230, and a controller 1240. The CSI-RS signal generator 1200 generates a transmission signal of a CSI-RS. Further, a new control channel generator 1210 generates a control signal for a new signal to be transmitted using a muting pattern according to an embodiment of the present invention. The other signal generator 1220 generates other transmission signals, e.g., a traffic channel. The signals generated by the generators 1200, 1210, and 1220 are input to a multiplexer 1230, which multiplexes the signals on frequency and time resources under a control of the controller 1240. The control signal from the new control channel generator 1210 is arranged for transmission on a muting pattern designated by the BS as described above.

The controller 1240 controls an overall operation of a BS. Specifically, the controller 1240 controls the BS to transmit control information through an optional resource according a plurality of determined muting patterns. More specifically, the controller 1240 determines a resource transmitting the CSI-RS and a resource applying muting. Thereafter, the controller 1240 determines a resource for transmitting a control signal with respect to a new terminal according to the muting pattern. As described above, the resource transmitting the control signal for the new terminal is applied as muting with for the legacy LTE-A terminal.

Further, the controller 1240 controls control information including the determined resource information to be transmitted to a terminal. However, before transmitting resource information to the terminal, the controller 1240 may transmit higher layer signaling to the new terminal and the legacy LTE-A terminal. As described above, the higher layer signaling for the new terminal may include information for receiving a CSI-RS by the new terminal, resource information as to which resources have muting applied, and resource information for transmitting a control signal to the new terminal. The higher layer signaling for the legacy LTE-A terminal may include information for receiving the CSI-RS by the legacy LTE-A terminal and resource information as to which resources have muting applied.

Figure 13:
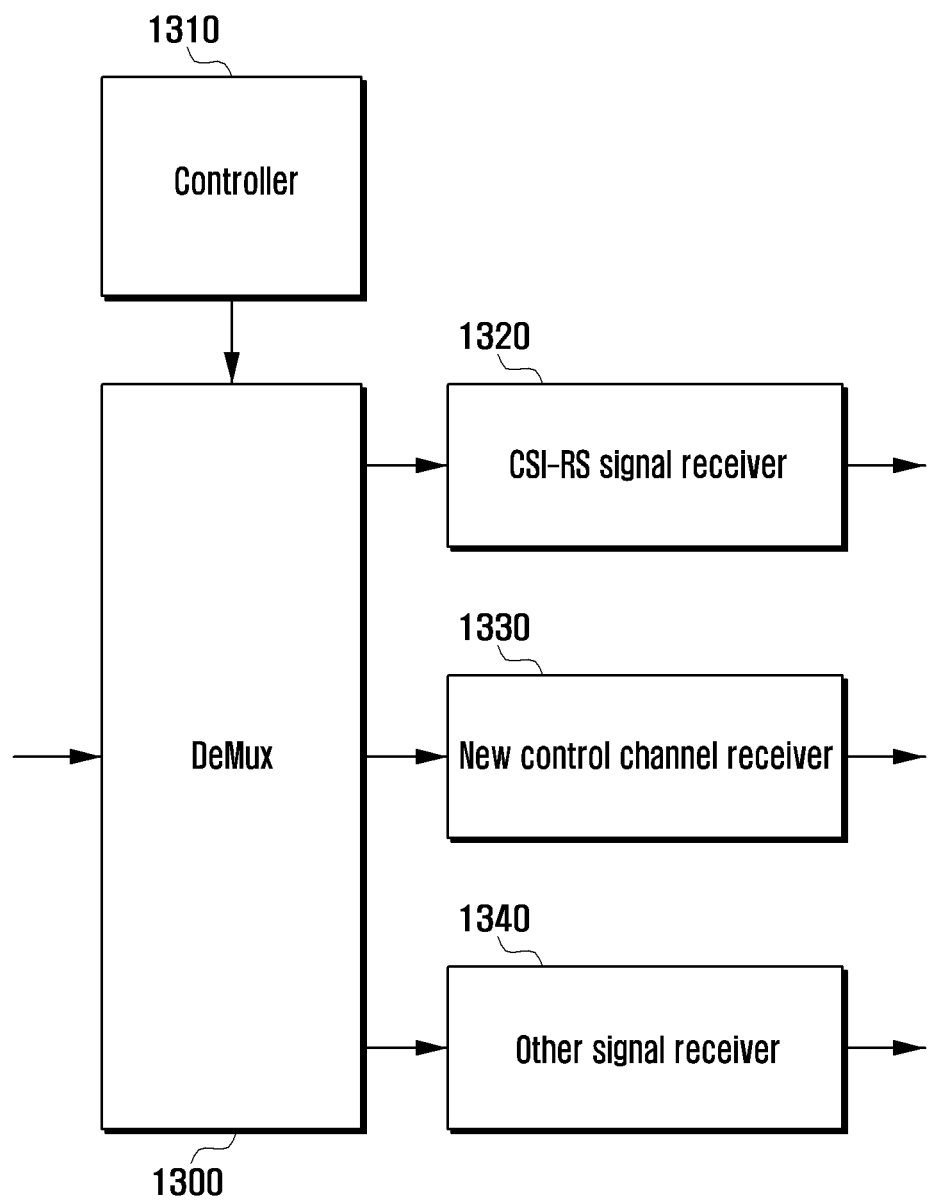
FIG. 13 is a block diagram illustrating a terminal for receiving a signal from a BS according to an embodiment of the present invention.

FIG. 13 is a block diagram illustrating a new terminal for receiving a control signal provided from a BS according to an embodiment of the present invention.

Referring to FIG. 13, the terminal include a demultiplexer (DeMux) 1300, a controller 1310, a CSI-RS signal receiver 1320, a new control channel receiver 1330, and an other signal receiver 1340. The received signal is input to a demultiplexer 1300, which demultiplexes the signal into a CSI-RS, a control signal for the new terminal, and other signals under the control of the controller 1310. Specifically, the demultiplexer 1300 outputs the CSI-RS to the CSI-RS signal receiver 1320, outputs a control signal for the new terminal to the new control channel receiver 1330 for a control signal transmitted in a muting pattern location, and outputs the other signals to the other signal receiver 1340.

The controller 1310 may control the reception of higher layer signaling provided from the BS. In this case, the higher layer signaling for the new terminal may include information for receiving the CSI-RS, resource information as to which resources have muting applied, and resource information for transmitting a control signal to the new terminal.

The above-described embodiments of the present invention illustrate that a conventionally defined muting pattern may be used to transmit a control signal to a new terminal, i.e., a terminal released after LTE-A.

Although embodiments of the present invention have been described above with reference to transmission of a control signal, the methods are equally applicable to other reference signals or traffic signals.

In addition, although embodiments of the present invention have been described where signals are transmitted to a new terminal, similar results may be obtained between terminals of the same release.

In accordance with above-described embodiments of the present invention, a new control signal is transmitted using a reference signal pattern and muting previously defined in a mobile communication system. Accordingly, limited wireless resources may be efficiently used, while reducing interference occurring between transmitted signals.

Although certain embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and their equivalents.

What is claimed is:

1. A method of transmitting a control signal by a Base Station (BS) to in a wireless communication system transmitting the control signal according to a plurality of Channel Status Information Reference Signal (CSI-RS) muting patterns, the method comprising:
   determining a resource for transmitting a CSI-RS and a resource for applying muting;
   determining a resource for transmitting the control signal to a first terminal using at least one of the plurality of CSI-RS muting patterns; and
   transmitting the control signal to the first terminal using the determined resource according to the at least one of the plurality of CSI-RS muting patterns,
   wherein the resource for transmitting the control signal to the first terminal is applied as a resource to which muting is applied for the second terminal.

2. The method of claim 1, wherein the resource for transmitting the control signal to the first terminal does not overlap the resource for transmitting the CSI-RS and the resource to which muting is applied.

3. The method of claim 1, further comprising transmitting higher layer signaling to the first and second terminals, before transmitting the control signal,
   wherein the higher layer signaling for the first terminal includes information for receiving the CSI-RS by the first terminal, resource information as to which resources have muting applied for the first terminal, and resource information for transmitting the control signal to the first terminal, and
   wherein the higher layer signaling for the second terminal includes information for receiving the CSI-RS and resource information as to which resources have muting applied for second terminal.

4. The method of claim 1, wherein the control signal transmitted to the first terminal is a wideband signal or a sub-band signal.

5. A method of receiving a control signal from a Base Station (BS) by a terminal in a wireless communication system transmitting the control according to a plurality of Channel Status Information Reference Signal (CSI-RS) muting patterns, the method comprising:
   receiving a CSI-RS using a resource for receiving the CSI-RS;
   receiving a control signal using a resource for receiving the control signal according to at least one of the plurality of CSI-RS muting patterns, and
   processing the control signal,
   wherein the resource for receiving the control signal by a first terminal is applied to a second terminal as a resource to which muting is applied.

6. The method of claim 5, wherein the resource for receiving the control signal by the first terminal does not overlap the resource for receiving the CSI-RS and the resource to which muting is applied for the first terminal.

7. The method of claim 5, wherein the control signal received by the first terminal is a wideband signal or a sub-band signal.

8. The method of claim 5, further comprising receiving higher layer signaling from the BS, before receiving the control signal,
wherein the higher layer signaling for the first terminal includes information for receiving a Channel Status Information Reference Signal (CSI-RS) by the first terminal, resource information as to which resources have muting applied for the first terminal, and resource information for receiving the control signal by the first terminal, and
wherein the higher layer signaling for the second terminal includes information for receiving the CSI-RS and resource information as to which resources have muting applied for second terminal.

9. A Base Station (BS) for transmitting control signal to first and second terminals in a wireless communication system transmitting the control signal according to a plurality of Channel Status Information Reference Signal (CSI-RS) muting patterns, the BS comprising:
a controller that determines a resource for transmitting a CSI-RS and a resource for applying muting, and determines a resource for transmitting the control signal to the first terminal using at least one of the plurality of CSI-RS muting patterns; and
a transceiver that transmits the control signal to the first terminal using the determined resource according to the at least one of the plurality of CSI-RS muting patterns,
wherein the resource for transmitting the control signal to the first terminal is applied as a resource to which muting is applied for the second terminal.

10. The BS of claim 9, wherein the resource for transmitting the control signal to the first terminal does not overlap the resource for transmitting the CSI-RS and the resource to which muting is applied.

11. The BS of claim 9, wherein the controller controls the BS to transmit higher layer signaling to the first and second terminals, before transmitting the control signal,
wherein the higher layer signaling for the first terminal includes information for receiving the CSI-RS by the first terminal, resource information as to which resources have muting applied for the first terminal, and resource information for transmitting the control signal to the first terminal, and
wherein the higher layer signaling for the second terminal includes information for receiving the CSI-RS and resource information as to which resources have muting applied for second terminal.

12. The BS of claim 9, wherein the control signal transmitted to the first terminal is a wideband signal or a sub-band signal.

13. A terminal for receiving a control signal from a Base Station (BS) in a wireless communication system transmitting the control signal according to a plurality of Channel Status Information Reference Signal (CSI-RS) muting patterns, the terminal comprising:
a transceiver that receives a CSI-RS using a resource for receiving the CSI-RS, and receives a control signal using a resource for receiving the control signal according to at least one of the plurality of CSI-RS muting patterns; and
a controller that processes the control signal,
wherein the resource for receiving the control signal by a first terminal is applied to a second terminal as a resource to which muting is applied.

14. The terminal of claim 13, wherein the resource for receiving the control signal by the first terminal does not overlap the resource for receiving the CSI-RS and the resource to which muting is applied for the first terminal.

15. The terminal of claim 13, wherein the control signal received by the first terminal is a wideband signal or a sub-band signal.

16. The terminal of claim 13, wherein the controller controls that the terminal to receive higher layer signaling from the BS, before receiving the control signal,
wherein the higher layer signaling for the first terminal includes information for receiving a Channel Status Information Reference Signal (CSI-RS) by the first terminal, resource information as to which resources have muting applied for the first terminal, and resource information for receiving the control signal by the first terminal, and
wherein the higher layer signaling for the second terminal includes information for receiving the CSI-RS and resource information as to which resources have muting applied for second terminal.

* * * * *